3,113,419
TRICYCLIC MONOSPIRANE HYDROCARBONS AS HIGH ENERGY FUELS
Stanley D. Koch, Swampscott, Mass., assignor, by mesne assignments, to Monsanto Research Corporation, Everett, Mass., a corporation of Delaware
No Drawing. Filed Sept. 21, 1960, Ser. No. 57,397
7 Claims. (Cl. 60—35.4)

This invention relates to high energy fuels. More particularly, this invention relates to methods of developing thrust and to methods of operating reaction type power plants. This invention especially contemplates a high energy fuel composition comprising a tricyclic monospirane hydrocarbon as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas-turbine or a turbo-prop engine, the exhaustion of the high temperature gases is directed into a turbine which drives a propeller or other mechanical means for developing a forward thrust. Reaction power plants may be used in widely different types of vehicles such as in space ships, aircraft, boats, guided missiles, automobiles and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher, but the presently available JP-4 fuel is thermally stable to a temperature of only about 400° F. Therefore, it is desirable to have a fuel which is thermally stable at temperatures at least as high as 500° F.

Another serious disadvantage of the prior art known fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb., but also a high energy level on a volume basis or a high B.t.u./gal., since wing sections are being made thinner in order to reduce drag and the space for storage of fuel is limited. Thus, aircraft are very often volume-limited as well as weight-limited for the storage of fuel. Aircraft are particularly volume-limited using the currently available JP-6 high energy fuel which has a heat of combustion of 18,400 B.t.u./lb. on a weight basis, but a heat of combustion of only 119,500 B.t.u./gal. on a volume basis. Therefore, it is particularly desirable to provide a high energy fuel having a high heat of combustion on a volume basis, preferably greater than 120,000 B.t.u./gal., and at the same time obtain the other characteristics necessary for a good fuel of this type.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing the fuel tanks, the structural strength of the fuel tanks must also be increased, adding to the weight and volume of the vehicle. Thus, present day aircraft using the current JP-6 fuel are both altitude limited and weight limited because such fuel has a boiling point in the range of from 300° F. to 350° F. It is desirable that a fuel have a boiling point at least above 400° F. in order to overcome these limitations.

An object of this invention is to provide high energy fuel compositions for use in reaction type power plants. Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines, including turbo-prop and gas-turbine engines.

Other aspects, objects, and advantages of this invention will be apparent from a consideration of the accompanying disclosure and the appended claims.

According to the present invention, there are provided high energy fuel compositions comprising, as an essential ingredient, a tricyclic monospirane hydrocarbon, preferably a tricyclic monospirane hydrocarbon of the formula

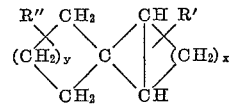

wherein $x$ is a whole number of from 1 to 4 inclusive, $y$ is a whole number of from 0 to 3, inclusive, the value of $y$ always being 1 less than the value of $x$, and $R'$ and $R''$ are each selected from the group consisting of hydrogen and methyl groups, $R'$ and $R''$ being the same or different, but $R''$ being hydrogen when $y$ is 0.

Also, according to the present invention, there are provided improved methods of developing thrust, said methods comprising oxidizing a high energy fuel composition comprising, as an essential ingredient, a tricyclic monospirane hydrocarbon, preferably a tricyclic monospirane hydrocarbon as defined above, with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, a tricyclic monospirane hydrocarbon, preferably a tricyclic monospirane hydrocarbon as defined above, into the combustion chamber of said reaction type power plant in such proportion as to produce a combustible mixture, subjecting said combustible mixture to combustion, and exhausting the resulting gases from said combustion chamber so as to impart thrust thereto.

Preferably, the tricyclic monospirane hydrocarbon components of the high energy fuel compositions of this invention are the monospirane hydrocarbons containing 3 cycloalkyl groups but only one spiro carbon atom, e.g., one carbon atom which is held in common by two cyclic rings. Preferably, the cyclic rings are unsubstituted; however, two of the cyclic rings may be substituted with methyl groups without substantial adverse effect on the heat of combustion of the compound.

In the formula of the preferred tricyclic monospirane hydrocarbons given above, $x$ is a whole number of from 1 to 4, inclusive, and $y$ is a whole number of from 0 to 3, inclusive, but the value of $y$ is always 1 less than the value of $x$. Thus, where $x$ is 1 and $y$ is 0, the tricyclic monospirane is a spiro[bicyclo(1.1.0)butane-2,1'-cyclopropane] of the formula

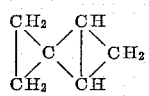

Where $x$ is 2 and $y$ is 1, the tricyclic monospirane is a spiro[bicyclo(2.1.0)pentane-5,1'-cyclobutane] of the formula

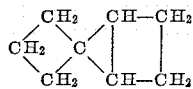

Where $x$ is 3 and $y$ is 2, the tricyclic monospirane is a spiro[bicyclo(3.1.0)hexane-6,1'-cyclopentane] of the formula

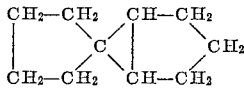

Where $x$ is 4 and $y$ is 3, the tricyclic monospirane is a spiro[bicyclo(4.1.0)heptane-7,1'-cyclohexane] of the formula

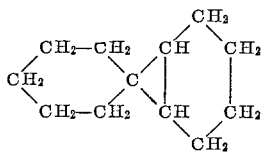

The tricyclic monospirane hydrocarbons of this invention may be prepared from a cycloketone in a three-step process wherein the cycloketone is condensed with itself to form an $\alpha,\beta$-unsaturated ketone which is reacted with hydrazine to form a pyrazoline for reduction and rearrangement into the tricyclic monospirane. The self-condensation step is preferably effected in the presence of a base catalyst. The reaction of the $\alpha,\beta$-unsaturated ketone with hydrazine is advantageously carried out in a solvent, preferably in ethanol. The reaction of the pyrazoline is preferably carried out in the presence of a base such as potassium hydroxide and a supported platinum catalyst.

The advantages, desirability, and usefulness of the present invention are illustrated by the following examples.

EXAMPLE 1

In this example, spiro[bicyclo(3.1.0)hexane-6,1'-cyclopentane] was prepared from cyclopentanone which was self-condensed in a base-catalyzed aldol condensation reaction to form the $\alpha,\beta$-unsaturated ketone, 2-cyclopentylidene-cyclopentanone having a boiling point of 69–72° C./0.3 mm. The pyrazoline was formed by reacting 495 g. (3.3 moles) of the $\alpha,\beta$-unsaturated ketone with 200 ml. (6 moles) of 95% hydrazine in solution in 900 ml. of absolute ethanol. This mixture was heated under reflux on a steam bath for a period of 7 hours and then kept at room temperature overnight. At the end of this time, a white solid was precipitated by agitation of the resulting reaction solution. The product was isolated by suction filtration and the precipitation repeated two more times to obtain 443 g. (82% yield) of the pyrazoline, spiro[bicyclo(3.3.0)-2,3-diaza-1-octene-4,1'-cyclopentane].

In the final step, 442.5 g. (2.7 moles) of the pyrazoline was introduced into a 2-liter round bottom flask together with 100 g. of powdered potassium hydroxide and between 3 and 4 g. of platinized porous clay chips for reduction and rearrangement into the tricyclic monospirane. The round bottom flask containing the above mixture was then arranged for distillation and rapidly heated to a temperature of 190–200° C. in an oil bath. The reaction was judged complete at the end of about 5 hours when the rapid evolution of nitrogen had ceased. The oily distillate and the reaction flask liquid residue were then combined, washed twice with 5% aqueous acetic acid, four times with water, one with aqueous saturated sodium chloride solution and finally dried over anhydrous potassium carbonate. The crude yellow liquid was then fractionated through a 1.5 x 37 cm. column to obtain 108.3 g. of the spiro[bicyclo(3.1.0)hexane-6,1'-cyclopentane] having a boiling point of 66–69° C./11–12 mm., a density $d_4^{20}$ 0.9187 and index of refraction $n_D^{20}$ 1.4858. Analysis of the product was found to be 88.1 wt. percent carbon and 11.8 wt. percent hydrogen as compared with calculated values of 88.2 wt. percent carbon and 11.8 wt. percent hydrogen. The proposed structure of this compound was confirmed by an inspection of the infrared spectrum of the product.

EXAMPLE 2

In this example, spiro[bicyclo(3.1.0)hexane-6,1'-cyclopentane] was subjected to inspection tests in order to show from the thermal and physical properties of a typical tricyclic monospirane, the suitability of these compounds in the operation of a reaction type power plant. The results of these tests are given in Table 1.

*Table 1*

THERMAL AND PHYSICAL PROPERTIES OF SPIRO-[BICYCLO(3.1.0)HEXANE-6,1'-CYCLOPENTANE FUEL

| | |
|---|---|
| Hydrogen/carbon ratio | 0.143 |
| Index of refraction, $n_D^{20}$ | 1.4843 |
| Boiling point, °C | 189 |
| Density at 99° C., g./ml | 0.8523 |
| Heat of combustion, B.t.u./lb., net | 18,163 |
| Heat of combustion, B.t.u./gal., net | 139,765 |
| Viscosity, cs.: | |
| At 38° C | 1.60 |
| At 99° C | 0.79 |
| At 166° C | 0.53 |
| Thermal decomposition temp., °F | 744 |

Heats of combustion were obtained with a Parr oxygen bomb calorimeter on both a weight and a volume basis following the ASTM D-240-57T procedure. Density was determined at a temperature of 99° C., using a Lipkin bicapillary pycnometer. Viscosities at various temperatures were measured using the standard Cannon-Fenske capillary viscosimeter following ASTM D-445 procedure.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature was measured at which the fuel began to decompose and evolve gas as determined by the changes in pressure within the bomb. In this method, the formation of deposits in the decomposition reaction is not measured because some fuels may start to decompose to gas before forming deposits.

The above examples indicate that the tricyclic monospiranes of this invention are very suitable for use in various reaction type power plants. The tricyclic monospiranes have particularly high heats of combustion on a volume basis and may therefore be very advantageously employed in both jet propulsion type engines and gas-turbine engines where there is a space limitation for the storage of fuel. Thus, the 139,765 B.t.u./gal. heat of combustion of spiro[bicyclo(3.1.0)hexane-6,1'-cyclopentane] permits a jet propulsion aircraft to fly considerably further than an aircraft having the same size storage tanks and using the currently available JP-6 fuel which has a heat of combustion of only 119,500 B.t.u./gal. Another advantage in utilizing the tricyclic monospirane fuels of this invention in reaction type power plants is that these fuels have extremely low freezing points and relatively high boiling points, thus possessing a very broad boiling range. A broad boiling range fuel is very necessary for use in aircraft type engines where the engine is subjected to not only low temperatures, either on the ground or in the air, but also to low pressures at high altitudes. If the freezing point of the fuel is too high, the viscosity of the liquid fuel may become so great as to make supplying the fuel to the engine very difficult or almost impossible. If the fuel has a very low boiling point, large amounts of the fuel will be lost at higher altitudes by vaporization unless the system is fully pressurized. Thus, the relatively high boiling point of spiro[bicyclo(3.1.0)hexane-6.1'-cyclopentane] permits an aircraft to operate at considerably higher temperatures than an aircraft using the JP-6 fuel having a lower boiling point.

The tricyclic monospirane hydrocarbons of this invention are also characterized by unusually high thermal stabilities when employed as fuel in a reaction type power plant. This factor is of importance not only in the actual combustion taking place in the engine, but also in the fuel system prior to the burning step. For example, it is necessary in high speed aircraft to use the fuel reservoir to absorb the aerodynamic heat which builds up faster than can be dissipated to the atmosphere and thereby heats the fuel to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the tricyclic monospirane fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas-turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or other chemical oxidizer, for example, fuming nitric acid, hydrogen peroxide, fluorine, and the like, in guided missile and rocket applications. In some applications, a mixture of oxidizing agents will also be useful.

The tricyclic monospirane fuel compositions of the present invention may be blended with other materials such as gasoline, kerosene, mixtures of gasoline and kerosene, other aviation fuels, and with the present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteritics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.0005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing tricyclic monospirane hydrocarbons as an essential ingredient, (2) improved methods of developing thrust, and (3) methods of operating reaction type power plants.

I claim:

1. The method of developing thrust in a reaction chamber which comprises oxidizing in said reaction chamber a hydrocarbon fuel comprising a tricyclic monospirane compound of the formula

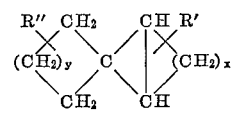

wherein $x$ is an integer of from 1 to 4, $y$ is an integer of from 0 to 3 and wherein the value of $y$ is always 1 less than the value of $x$, and $R'$ is selected from the class consisting of hydrogen and methyl and $R''$ is hydrogen when $y$ is 0, and is selected from the class consisting of hydrogen and methyl when $y$ is greater than 0, to produce a mass of high temperature gases, and exhausting said gases from the reaction chamber in a manner so as to develop a high thrust.

2. The method of operating a reaction type power plant which comprises injecting into the combustion chamber of said power plant a stream of an oxidizing agent and a stream of a hydrocarbon fuel comprising the tricyclic monospirane defined in claim 1, oxidizing said fuel in said chamber, and exhausting the resulting gases from said chamber so as to impart thrust.

3. The method of operating a jet-propulsion engine which comprises injecting into the combustion chamber of said engine a stream of an oxidizing agent and a stream of a hydrocarbon fuel comprising the tricyclic monospirane defined in claim 1, oxidizing said fuel in said chamber, and exhausting the resulting gases in a rearward direction from said chamber so as to impart thrust to said engine.

4. The method of operating a gas-turbine engine which comprises injecting into the combustion chamber of said engine a stream of an oxidizing agent and a stream of a hydrocarbon fuel comprising the tricyclic monospirane defined in claim 1, oxidizing said fuel in said chamber, and exhausting the resulting gases from said combustion chamber through a turbine to develop motive power.

5. The method of operating a turbo-jet engine which comprises injecting into the combustion chamber of the engine a stream of air and a stream of a hydrocarbon fuel comprising the tricyclic monospirane defined in claim 1, burning said fuel in said chamber, exhausting the resulting gases from said chamber through a turbine to expand the same and compress the air supplied to said chamber, and passing gases into the atmosphere by way of a nozzle to impart thrust to said engine.

6. The method of operating a turbo-jet engine which comprises injecting into the combustion chamber of said engine a stream of air and a stream of the tricyclic monospirane defined in claim 1, burning said monospirane in said chamber, exhausting the resulting gases from said chamber through a turbine to expand the same and compress the air supplied to said chamber, and passing gases into the atmosphere by way of a nozzle to impart thrust to said engine.

7. The method of operating a turbo-jet engine which comprises injecting a stream of air and a stream of spiro [bicyclo(3.1.0)hexane-6,1'-cyclopentane] into the combustion chamber of said engine, effecting combustion in said chamber, exhausting the resulting gases from said chamber through a turbine to expand the same and compress the air supplied to said chamber, and passing gases into the atmosphere by way of a nozzle to impart thrust to said engine.

References Cited in the file of this patent

UNITED STATES PATENTS

| | | |
|---|---|---|
| 2,331,596 | Campbell | Oct. 12, 1943 |
| 2,514,546 | Ipatieff et al. | July 11, 1950 |
| 2,765,617 | Gluesenkamp et al. | Oct. 9, 1956 |
| 2,826,037 | Scott et al. | Mar. 11, 1958 |